(12) United States Patent
Dhuey et al.

(10) Patent No.: US 8,952,974 B2
(45) Date of Patent: Feb. 10, 2015

(54) LATENCY REDUCTION IN A DISPLAY DEVICE

(75) Inventors: Michael J. Dhuey, Cupertino, CA (US); Philip R. Graham, Milpitas, CA (US); Richard T. Wales, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 2250 days.

(21) Appl. No.: 11/456,298

(22) Filed: Jul. 10, 2006

(65) Prior Publication Data
US 2007/0247470 A1  Oct. 25, 2007

Related U.S. Application Data

(60) Provisional application No. 60/794,016, filed on Apr. 20, 2006.

(51) Int. Cl.
  G09G 5/36 (2006.01)
  G09G 5/00 (2006.01)
  G09G 5/395 (2006.01)
  G09G 5/393 (2006.01)
  H04L 29/06 (2006.01)

(52) U.S. Cl.
  CPC ............... *G09G 5/006* (2013.01); *G09G 5/395* (2013.01); *G09G 5/393* (2013.01); *G09G 2340/02* (2013.01); *G09G 2360/02* (2013.01); *G09G 2360/18* (2013.01); *H04L 65/80* (2013.01)
  USPC ........... 345/545; 345/547; 345/538; 345/539; 345/698

(58) Field of Classification Search
  USPC .......................... 345/545, 546, 547, 508, 132; 340/855.4, 855.5; 341/116, 117; 386/50; 375/240.12; 370/389
  See application file for complete search history.

(56) References Cited

U.S. PATENT DOCUMENTS 5,209,220 A * 5/1993 Hiyama et al. ................. 600/109
5,343,241 A    8/1994 Richards et al.
5,389,965 A    2/1995 Kuzma (Continued)

FOREIGN PATENT DOCUMENTS

EP  1 217 602 A2  6/2002
EP  1 628 480 A2  2/2006

OTHER PUBLICATIONS

Notification of Transmittal of the International Search Report and the Written Opinion of the International Searching Authority, or the Declaration for PCT/US 07/09310 (ISA/US); 8 pages, Feb. 11, 2008.

(Continued)

*Primary Examiner* — Abderrahim Merouan
(74) *Attorney, Agent, or Firm* — Baker Botts, L.L.P.

(57) ABSTRACT

A display device may reduce the latency of the display of a digital signal by reducing the latency that the display device adds to the digital signal. After a digital signal is received by an input module, the signal is stored in a frame buffer as a plurality of pixels. A controller determines the input frame rate of the digital signal and a pixel delay. The controller monitors the frame buffer to determine when the frame buffer has stored a number of pixels greater than or equal to the pixel delay. After the frame buffer contains enough pixels, the controller initiates transmission of the pixels from the frame buffer to a display module. In certain embodiments, the controller initiates transmission of the pixels to the display module before the frame buffer has stored all pixels corresponding to the frame.

23 Claims, 2 Drawing Sheets

(56) References Cited

U.S. PATENT DOCUMENTS

| | | | |
|---|---|---|---|
| 5,574,934 A * | 11/1996 | Mirashrafi et al. | 709/207 |
| 5,598,209 A | 1/1997 | Cortjens et al. | |
| 5,712,474 A | 1/1998 | Naneda | |
| 5,784,488 A * | 7/1998 | Kuwata | 382/176 |
| 5,818,514 A * | 10/1998 | Duttweiler et al. | 348/14.1 |
| 5,841,439 A * | 11/1998 | Pose et al. | 345/418 |
| 5,859,979 A * | 1/1999 | Tung et al. | 709/228 |
| 5,898,457 A | 4/1999 | Nagao et al. | |
| 5,956,509 A * | 9/1999 | Kevner | 719/330 |
| 6,075,543 A * | 6/2000 | Akeley | 345/539 |
| 6,111,582 A * | 8/2000 | Jenkins | 345/421 |
| 6,177,922 B1 * | 1/2001 | Schiefer et al. | 345/698 |
| 6,212,206 B1 * | 4/2001 | Ketcham | 370/516 |
| 6,278,478 B1 | 8/2001 | Ferriere | |
| 6,289,390 B1 * | 9/2001 | Kavner | 719/310 |
| 6,313,838 B1 * | 11/2001 | Deering | 345/420 |
| 6,346,970 B1 | 2/2002 | Boehlke | |
| 6,445,411 B1 | 9/2002 | Shibata et al. | |
| 6,582,980 B2 * | 6/2003 | Feldman et al. | 438/28 |
| 6,795,106 B1 | 9/2004 | Cooper | |
| 6,806,898 B1 | 10/2004 | Toyama et al. | |
| 6,970,198 B1 | 11/2005 | Schinner et al. | |
| 7,046,278 B1 * | 5/2006 | Dong et al. | 348/229.1 |
| 7,075,564 B1 * | 7/2006 | Jewell et al. | 348/14.01 |
| 7,119,811 B2 * | 10/2006 | Ernst et al. | 345/545 |
| 7,586,492 B2 * | 9/2009 | Riach et al. | 345/502 |
| 7,710,450 B2 | 5/2010 | Dhuey et al. | |
| 2002/0142504 A1 * | 10/2002 | Feldman et al. | 438/30 |
| 2004/0049793 A1 * | 3/2004 | Chou | 725/87 |
| 2004/0136459 A1 * | 7/2004 | Yavits et al. | 375/240.12 |
| 2004/0240436 A1 * | 12/2004 | Yao et al. | 370/352 |
| 2005/0018927 A1 | 1/2005 | Manabe | |
| 2005/0024369 A1 * | 2/2005 | Xie | 345/547 |
| 2005/0024501 A1 * | 2/2005 | Ellenby et al. | 348/207.99 |
| 2005/0163116 A1 * | 7/2005 | Anderson et al. | 370/389 |
| 2005/0195206 A1 * | 9/2005 | Wogsberg | 345/547 |
| 2005/0237952 A1 * | 10/2005 | Punj et al. | 370/260 |
| 2005/0259179 A1 | 11/2005 | Robertson et al. | |
| 2006/0203730 A1 * | 9/2006 | Zur | 370/235 |
| 2007/0186002 A1 * | 8/2007 | Campbell et al. | 709/231 |
| 2007/0263077 A1 | 11/2007 | Dhuey et al. | |

OTHER PUBLICATIONS

Supplemental European Search Report for PCT/US2007/009310; EPO, 8 pages, Apr. 23, 2009.
Communication Pursuant to Article 94(3) EPC issued by the EPO; Reference: P32635EP-PCT; Application No./Patent No. 07755542.3-1228/2013867, Sep. 18, 2009.
Dhuey et al., U.S. Appl. No. 11/456,339, Office Action from the U.S. Patent and Trademark Office mailed Sep. 11, 2008.
European Communication Pursuant to Article 94(3) EPC, 6 pages, dated Jan. 25, 2011.
The Third Office Action from the Patent Office of the People's Republic of China, Application No. 2007800141437.4 dated Sep. 4, 2012, received Nov. 9, 2012.
Communication pursuant to Article 94(3) EPC, Application No. 07 755 542.3-1903, dated Jul. 5, 2013, 6 pages.
First Office Action in Chinese National Phase; Reference: Application No. 200780014188.3 from State IPO Office of the People's Republic of China; 9 pages, Apr. 29, 2010.

* cited by examiner

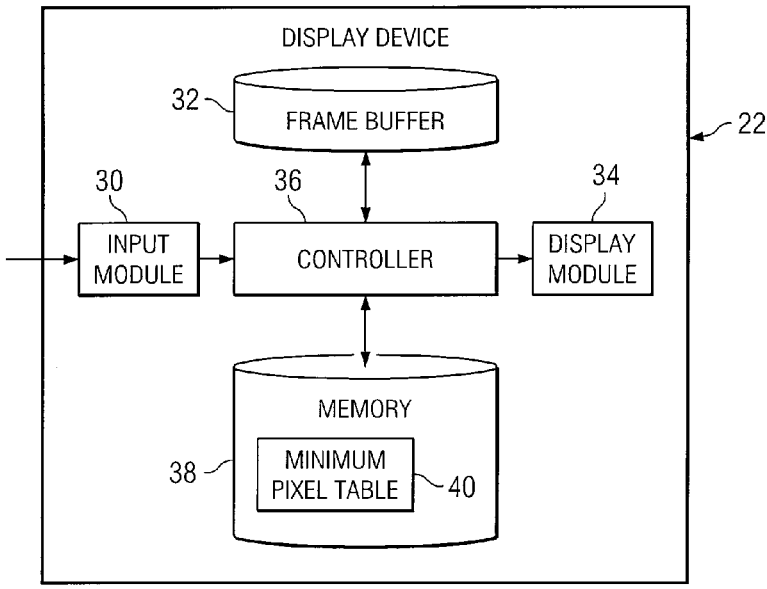
FIG. 2A
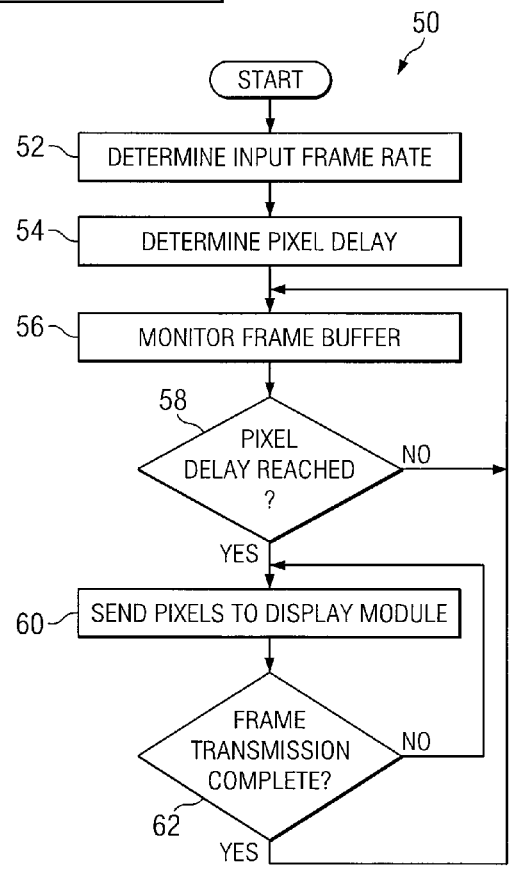
FIG. 2B
FIG. 3

LATENCY REDUCTION IN A DISPLAY DEVICE

RELATED APPLICATIONS

This application claims priority to U.S. Patent Application Ser. No. 60/794,016, entitled "VIDEOCONFERENCING SYSTEM," which was filed on Apr. 20, 2006.

TECHNICAL FIELD OF THE INVENTION

The present invention relates generally to telecommunications and, more particularly, to latency reduction in a display device.

BACKGROUND OF THE INVENTION

In telecommunications, components that create, transmit, and receive signals may introduce latency. The analog display devices that were originally developed did not use digital technology to display an image and had no significant capability to store an image. To create an image, analog display devices sometimes used phosphors to store the image long enough for the human eye to perceive it. Later, digital technology was incorporated in these display devices, which often introduced latency in a signal. For example, devices encoding, decoding, compressing, decompressing, scaling, de-interlacing, or adding information to (e.g. an on-screen display) a signal can increase the amount of time it takes a signal to reach its intended destination. While a certain amount of latency is often not perceptible by users, too much latency can be detected by and bothersome to users.

SUMMARY

In accordance with the present invention, techniques for reducing latency in a display device are provided. According to particular embodiments, these techniques describe a method of reducing the latency of a digital signal by reducing the latency added by the recipient's display device.

According to a particular embodiment, a display device for reducing latency comprises an input module that is able to receive a digital signal, which has an associated frame rate. The digital signal comprises a frame, which includes a plurality of pixels. The display device also comprises a frame buffer that is able to store one or more of the pixels and a display module that is able to receive the pixels and to display the frame. The display device also comprises a controller that is able to determine the frame rate of the digital signal and to determine a pixel delay from the frame rate. The controller is also able to monitor the frame buffer and, when the frame buffer contains a number of pixels greater than or equal to the pixel delay but less than all pixels corresponding to the frame, to instruct the frame buffer to initiate transmission of the pixels to the display module.

Embodiments of the invention provide various technical advantages. For example, these techniques may help to reduce the latency of digital signals in a video conference to a level imperceptible by a user. In a video conference, a user and a remote user communicate through audio and video signals. Too much of a delay between the audio signal and the video signal is perceptible by and bothersome to users. Also, a user may be distracted if responses from the remote user seem to be delayed. In particular embodiments, reducing the latency of digital signals causes a communication between remote users to appear to the users to not be remote. In some embodiments, reducing the latency incurred by a display device allows other elements of the system to introduce additional latency in the performance of more complicated and time consuming signal processing while maintaining the same overall latency.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is made to the following description taken in conjunction with the accompanying drawings in which:

FIGS. 2A-B illustrate a display device employing latency reduction and a minimum pixel table stored in the display device; and FIG. 3 is a flowchart illustrating a method of reducing the latency added to a digital signal by a display device.

DETAILED DESCRIPTION OF THE DRAWINGS

Figure 1:
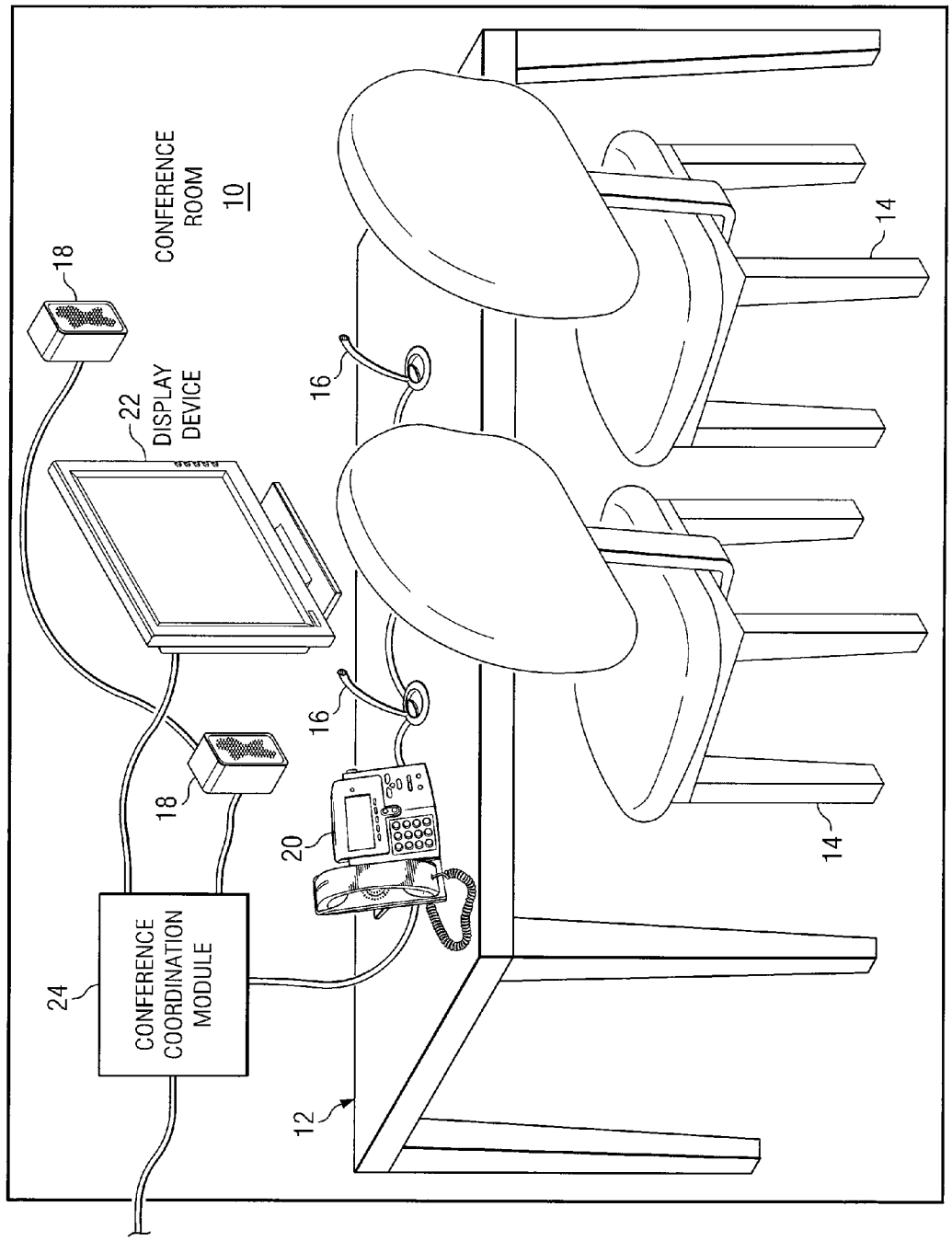
FIG. 1 illustrates a conference room in which a display device having reduced latency may be employed.

FIG. 1 illustrates a conference room 10 in which a display device having reduced latency may be employed. As illustrated, conference room 10 includes table 12, chairs 14, microphone 16, loudspeakers 18, user interface 20, display device 22 and conference coordination module 24. In general, the elements within conference room 10 provide video conferencing functionality, and elements within display 22 interoperate to reduce the latency of the display of a digital signal.

Table 12 and chairs 14 may be included in conference room 10 to provide a user with a more comfortable environment. Microphones 16 may be used to convert sound in conference room 10, e.g. a user's voice, into a digital audio signal for transmission to a remote site or sites. Also, loudspeakers 18 may be used to convert digital audio signals received from the remote site or sites into sound in conference room 10. While illustrated as having a particular configuration, conference room 10 may include any suitable number and arrangement of table 12, chairs 14, microphones 16, and loudspeakers 18 in any appropriate location.

Remote sites, not illustrated, may be any suitable elements communicating with conference room 10 through a telephone call, a video conference, or any other suitable communication. As used herein, "remote site" includes any equipment used to participate in a video communication session, including elements that encode, compress, and/or otherwise process signals to be transmitted to conference room 10. In particular embodiments, the remote site may be a room similar to conference room 10. In other embodiments, the remote site may employ a videoconferencing phone, a phone operable to transmit data signals with audio signals, an audio-only phone, or any other suitable device. In some embodiments, the remote site may be located a significant distance from conference room 10. However, while described as "remote," the remote site may be in any appropriate location, including in the same building as conference room 10.

In the illustrated embodiment, conference room 10 also includes user interface 20. User interface 20 may receive user input and provide a user with information regarding the operation of elements in conference room 10. For example, user interface 20 may receive user input to initiate a communication with a particular remote site, to place the communication on hold, to conference third parties, and to terminate the communication. In some embodiments, user interface 20 receives information regarding the communication from conference coordination module 24. For example, conference coordination module 24 may identify remote sites, the status of communications, call history for conference room 10, etc. In the illustrated embodiment, user interface 20 relays audio signals received from microphones 16. In particular embodiments, user interface 20 allows a user to interact with the functionality of conference coordination module 24, described more fully below. In general, user interface 20 may operate in any appropriate manner to facilitate the initiation, execution, maintenance, and termination of communications in conference room 10.

As illustrated, conference room 10 also includes display device 22. In general, display device 22 displays signals received from one or more remote sites. In particular embodiments, display device 22 may display a digital video signal, for example, by displaying an image of or a real-time video feed of remote users who are participating in the video conference. In some embodiments, conference coordination module 24 receives a digital video signal from the remote site and relays the signal to display device 22. While described as displaying a digital video signal, display device may also display digital data or other similar signals. In certain embodiments, display device 22 may also display other types of signals, such as digitized audio signals. Display device 22 may display digital audio signals through a device similar to loudspeakers 18 or any other appropriate device. In particular embodiments, conference coordination module 24 may perform signal processing on digital signals received from the remote sites; however, in other embodiments, some or all signal processing may be performed by display device 22. In some embodiments, display device 22 comprises a plasma screen television or similar plasma display. In other embodiments, display device 22 comprises a liquid crystal display (LCD), organic light emitting diode (OLED) display, field emissive device (FED) display, or any other suitable display device.

Display device 22 may reduce the overall latency of digital signals by decreasing the latency added to the digital signals by display device 22. In particular embodiments, digital signals are sent from one or more remote sites to conference coordination module 24. These digital signals typically include multiple frames, which are formed of a plurality of pixels. These digital signals may have an associated frame rate. After the digital signals are received, conference coordination module 24 may perform signal processing, such as decompression, decoding, error correction, etc., and then forward the digital signals to display device 22. Display device 22 may receive the digital signals and store pixels of each frame in a frame buffer prior to display. After a certain number of pixels of a frame are stored in the frame buffer, display device 22 may forward the pixels of the frame to a display module for display by display device 22. In some embodiments, the frame rate determines the number of pixels of a frame that should be stored in the frame buffer before the pixels are forwarded to the display module. In particular embodiments, the number of pixels stored in the frame buffer before beginning to transmit the pixels to the display module is at or near to a minimum number of pixels allowable without causing errors in the display of the frame. The display module may begin to process a frame for display prior to the frame buffer receiving all pixels corresponding to that frame.

In the illustrated embodiment, display device 22 is located in conference room 10; however, it is understood that display device 22 may be located or implemented in any environment in which a low-latency display device may be suitable. While display device 22 is described as having a particular configuration and functionality, display device 22 may be any device operable to display a digital signal while reducing the latency introduced by that device. Display device 22 may reduce latency in telephone or videoconferencing communications, or any other appropriate environment.

Conference coordination module 24 coordinates the functions of the various devices and elements within conference room 10. In particular embodiments, conference coordination module 24 is responsible for initiating and terminating communications between conference room 10 and remote sites. In some embodiments, conference coordination module 24 receives audio, video, and/or data signals from remote sites and forwards them to loudspeakers 18, user interface 20, and/or display device 22. Conference coordination module 24 may also receive audio, video, and/or data signals from users of conference room 10 or other devices in conference room 10, such as microphones 16 and user interface 20. Conference coordination module 24 may then forward these received audio, video, and/or data signals to remote sites. In certain embodiments, conference coordination module 24 interacts with other devices or elements, either located proximately or remotely, to facilitate communications in conference room 10. Conference coordination module 24 may be responsible for processing audio, video, and/or data signals sent by or to remote sites.

Particular embodiments of a system for reducing the latency of a display device have been described and are not intended to be all inclusive. While conference room 10 is depicted as containing a certain configuration and arrangement of elements and devices, it should be noted that this is merely an example arrangement of elements and devices. User interface 20, display device 22, and conference coordination module 24 represent logical depictions of elements and devices employing particular functionality. In general, the components and functionality of conference room 10 may be provided by any suitable collection and arrangement of components and may be combined, separated, distributed, or replaced as appropriate both logically and physically. The functions performed by the various components of conference room 10 may be accomplished by any suitable devices to reduce the latency added to a digital signal by a display device. Additionally, while digital signals are described, other embodiments may provide reduced latency for a display device receiving analog signals and converting those signals into digital-based signals or data.

FIGS. 2A-B illustrate display device 22 employing latency reduction and a minimum pixel table, indicated generally at 40, which is stored in and used by display device 22. FIG. 2A demonstrates the components and elements within display device 22. As illustrated, display device 22 includes input module 30, frame buffer 32, display module 34, controller 36, and memory 38. As illustrated, memory 38 includes minimum pixel table 40. In general, the components of display device 22 interoperate to reduce the latency added to digital signals received by display device 22.

Input module 30 receives signals from an external source. In particular embodiments, input module 30 receives digital signals from conference coordination module 24. The digital signals may encode pixels corresponding to one or more frames. In particular embodiments, the digital signals contain digital video frames. In some embodiments, input module 30 formats the received digital signals. Formatting may include decompressing, decoding, reformatting, or otherwise processing the signals. In certain embodiments, input module 30 receives digital signals, performs any required signal processing, and forwards frames to controller 36 and then to frame buffer 32 for storage. Input module 30 may be composed of any appropriate logic, software, or hardware for receiving digital signals.

Frame buffer 32 stores the pixels corresponding to frames to be displayed by display device 22. In the illustrated embodiment, frame buffer 32 receives the pixels from controller 36, who receives the signal from input module 30. In other embodiments, frame buffer 32 receives data from input module 30. After receiving data from controller 36, frame buffer 32 may store pixels until instructed to send the pixels to display module 34. Once instructed to transmit pixels, frame buffer 32 may begin to send pixels to display module 34. In the illustrated embodiment, frame buffer 32 sends the pixels to display module 34 through controller 36. In certain embodiments, frame buffer 32 receives the pixels to be stored after input module 30 or controller 36 extracts frames of pixels from received digital signals. In other embodiments, digital signals may simply be comprised of a plurality of frames. In certain embodiments, frame buffer 32 is operable to store multiple frames of pixels. In other embodiments, frame buffer 32 may store only pixels corresponding to a portion of a frame. Frame buffer 32 may receive pixels from input module 30 at a different rate and format than frame buffer 32 forwards pixels to display module 34. While described as a buffer, frame buffer 32 may employ any appropriate logic, software, hardware, etc. to store frame data received by display device 22 for display by display module 34.

Display module 34 displays the digital signal received by display device 22. Display module 34 may display pixels received from controller 36 and frame buffer 32. In certain embodiments, controller 36 receives pixels from frame buffer 32 and forwards them to display module 34. In other embodiments, frame buffer 32 sends the pixels directly to display module 34. In particular embodiments, display module 34 is a plasma display panel module. In other embodiments, display module 34 includes a liquid crystal display (LCD), organic light emitting diode (OLED) display, field emissive device (FED) display, or any other suitable display device. In certain embodiments, display module 34 must receive pixels according to a particular format. Display module 34 may require pixels to be received at a 60 Hz frame rate with blanking between rows of pixels within a frame. In some embodiments, input module 30, controller 36, and/or frame buffer 32 format pixels in the manner appropriate for display by display module 34. In general, display module 34 may be any device that is operable to display digital signals received by display device 22.

As illustrated, display device 22 also includes controller 36, memory 38, and minimum pixel table 40. Generally, controller 36 controls the operation of the components within display device 22. In some embodiments, controller 36 accesses memory 38, specifically minimum pixel table 40, to reduce the latency introduced by display device 22. Controller 36 may also receive digital signals from input module 30 and determine the frame rate of the received digital signals. Controller 36 may also access frame buffer 32 to determine the number of pixels stored in frame buffer 32. In particular embodiments, controller 36 initiates transmittal of pixels of a frame from frame buffer 32 to display module 34 when frame buffer 32 stores a number of pixels equal to the pixel delay, which is partially determined by the input frame rate. In certain embodiments, controller 36 is operable to format the pixels and/or the digital signal in any appropriate manner. In general, controller 36 may be operable to transmit, receive, and/or format data in any appropriate manner. Memory 38 stores minimum pixel table 40, which may indicate the pixel delay corresponding to various possible frame rates of a received digital signal. Also, memory 38 may include any additional hardware, software, firmware, or any other programming or files necessary for the operation of display device 22. While memory 38 is depicted as an element separate from controller 36, it should be understood that memory 38 and controller 36 may have any appropriate configuration and arrangement.

In operation of the illustrated embodiment, input module 30 receives digital signals encoding frame information from a remote site through conference coordination module 24. Controller 36 receives the signals from input module 30 and determines the frame rate of the digital signals. After determining the frame rate, controller 36 accesses minimum pixel table 40 in memory 38 in order to determine the pixel delay. In some embodiments, the pixel delay is selected to allow display device 22 to introduce the least amount of latency feasible. Meanwhile, input module 30 may perform signal processing on the digital signals. This processing may include decoding, decompressing, gamma correction or other forms of pixel value adjustment, resolution scaling, refresh rate scaling, image layering (e.g. adding text or graphics), extracting pixel information from the signals to obtain frames for display, and/or other image processing functions. After any processing, controller 36 forwards the frames to frame buffer 32. Frame buffer 32 stores the received pixels corresponding to a frame until the number of pixels stored equals the pixel delay. Controller 36 monitors frame buffer 32 to determine when the pixel delay is reached by monitoring frame buffer, setting an interrupt, informing frame buffer 32 of the pixel delay, or any other suitable methods. When the pixel delay is reached, controller 36 begins to move the frame from frame buffer 32 to display module 34 for display. Frame buffer 32 and/or controller 36 may format the frame for transmission to display module 34 in any appropriate manner. In particular embodiments, controller 36 formats the frame by transmitting the frame to display module 34 at an appropriate frequency or by introducing blanking.

While display device 22 is depicted as one element containing a particular configuration and arrangement of components, it should be noted that this is a logical depiction and the components and functionality of display device 22 may be provided by any suitable collection and arrangement of components. For example, the positioning and functions of controller 36 may be modified as appropriate. The functions performed by the various components of display device 22 may be accomplished by any suitable devices to reduce the latency added to a digital signal by display device 22.

FIG. 2B illustrates minimum pixel table 40, which includes a frame rate column 42 and a delay column 44. Frame rate column 42 includes one or more input frame rates. The frame rate of the received digital signal may be compared to these possible frame rates. In particular embodiments, frame rate column 42 includes one or more industry standard frame rates. In the illustrated embodiment, frame rate column 42 includes two possible input frame rates: 1080/30 and 1080/60. As illustrated, the format of frame rate column 42 is resolution format (as implied by vertical resolution divided by the frame refresh rate in Hertz. Delay column 44 includes the pixel delay corresponding to each entry in frame rate column 42. For example, for the industry standard input frame rate 1080/30, the pixel delay would be X pixels, and for 1080/60, the pixel delay would be Y pixels. Minimum pixel table 40 may include any appropriate number of industry standard or other suitable inputs. In some embodiments, minimum pixel table 40 includes non-industry standard inputs, for example, enterprise specific inputs. In certain embodiments, minimum pixel table 40 determines the pixel delay in a more complicated manner. For example, minimum pixel table 40 could use both the input frame rate and the formatting of display module 34 to determine the pixel delay. While information in minimum pixel table 40 is displayed in tabular form, it is understood that minimum pixel table 40 may store similar information in a database, group of files, hash, or any appropriate manner. In general, minimum pixel table 40 allows controller to determine how many pixels should be stored by frame buffer 32 before frame buffer 32 can begin to send the frame to display module 34 while still maintaining appropriate formatting of the frame transmitted to display module 34.

While minimum pixel table 40 is depicted as having a particular configuration and arrangement of data stored in a particular way, it is understood that this is merely a logical depiction. The functionality of minimum pixel table 40 may be provided by any suitable storage devices and may include any suitable factors for determining the pixel delay to be employed by display device 22.

FIG. 3 is a flowchart illustrating a method 50 of reducing the latency to a digital signal by display device 22. At step 52, controller 36 determines the input frame rate of the digital signals received by input module 30. In some embodiments, controller 36 accesses input module 30, whereas, in other embodiments, input module 30 sends the input frame rate to controller 36. In step 54, controller 36 accesses minimum pixel table 40 to determine the pixel delay. In some embodiments, the pixel delay is determined by the corresponding input frame rate in minimum pixel table 40. In particular embodiments, the pixel delay is at or near a minimum number of pixels that need to be stored by frame buffer 32 before frame buffer 32 can begin to send pixels to display module 34 without causing errors in the display. At step 56, controller 36 monitors frame buffer 32. In step 58, controller 36 determines whether the pixel delay has been reached. In some embodiments, controller 36 compares the pixel delay to the number of pixels stored in frame buffer 32. If the number of pixels stored in frame buffer 32 is greater than or equal to the pixel delay, then the minimum number of pixels has been reached. In other embodiments, controller 36 may use other techniques, such as a timer, to determine when to begin sending pixels from frame buffer 32 to display module 34. If the pixel delay has not been reached, method 50 returns to step 56, where controller 36 continues to monitor frame buffer 32. If, however, the pixel delay has been reached in step 58, the method proceeds to step 60. In step 60, controller 36 instructs frame buffer 32 to send the pixels of the frame to display module 34. In step 62, controller 36 determines whether or not frame transmission is complete. If transmission is not complete, method 50 returns to step 60, where frame buffer 32 continues to send pixels of the frame to display module 34. However, if transmission is complete in step 62, then method 50 returns to step 56.

The method described with respect to FIG. 3 is merely illustrative and it is understood that the manner of operation and devices indicated as performing the operations may be modified in any appropriate manner. While the method describes particular steps performed in a specific order, it should be understood that display device 22 contemplates any suitable collection and arrangement of elements performing some, all, or none of these steps in any operable order.

Although the present invention has been described in several embodiments, a myriad of changes and modifications may be suggested to one skilled in the art, and it is intended that the present invention encompass such changes and modifications as fall within the present appended claims.

What is claimed is:

1. A display device for reducing latency comprising:
an input module operable to receive a digital signal having an associated frame rate, the digital signal comprising a frame including a total number of pixels;
a frame buffer operable to store one or more of the pixels;
a display module operable to receive the pixels and to display the frame; and
a controller operable to:
determine the frame rate of the digital signal;
determine a pixel delay from the frame rate, the pixel delay including a threshold number of pixels;
determine a stored number of pixels in the frame buffer; and
in response to determining the stored number of pixels is greater than or equal to the threshold number of pixels but less than the total number of pixels, instruct the frame buffer to initiate transmission of the pixels to the display module.

2. The display device of claim 1, wherein the frame buffer has stored less than one percent of the total number of pixels corresponding to the frame when the controller instructs the frame buffer to initiate transmission of the pixels to the display module.

3. The display device of claim 1, wherein the controller determines the pixel delay by:
accessing a minimum pixel table;
comparing the frame rate to one or more industry standard frame rates stored in the minimum pixel table; and
setting the pixel delay to a delay indicated by the industry standard frame rate corresponding to the frame rate.

4. The display device of claim 1, wherein:
the input module receives the digital signal in a first format; and
the display module receives the pixels in a second format, the second format different than the first format.

5. The display device of claim 1, wherein the digital signal comprises a digital video signal in a video conference.

6. The display device of claim 1, wherein the display module comprises one selected from: a plasma display, a liquid crystal display, organic light emitting diode display, and field emissive device display.

7. The display device of claim 1, wherein the display module is further operable to display the pixels less than or equal to 150 milliseconds after a remote endpoint generates the digital signal.

8. A method for reducing the latency added by a display device comprising:
receiving a digital signal having an associated frame rate at an input module, the digital signal comprising a frame including a total number of pixels;
storing one or more of the pixels in a frame buffer;
determining the frame rate of the digital signal;
determining a pixel delay from the frame rate, the pixel delay including a threshold number of pixels;
determining a stored number of pixels in the frame buffer; and
in response to determining the stored number of pixels is greater than or equal to the threshold number of pixels but less than the total number of pixels, instructing the frame buffer to initiate transmission of the pixels to the display module.

9. The method of claim 8, wherein the frame buffer has stored less than one percent of the total number of pixels corresponding to the frame when the frame buffer is instructed to initiate transmission of the pixels to the display module.

10. The method of claim 8, wherein determining the pixel delay comprises:
accessing a minimum pixel table;
comparing the frame rate to one or more industry standard frame rates stored in the minimum pixel table; and
setting the pixel delay to a delay indicated by the industry standard frame rate corresponding to the frame rate.

11. The method of claim 8, wherein:
the input module receives the digital signal in a first format; and
the display module receives the pixels in a second format, the second format different than the first format.

12. The method of claim 8, wherein the digital signal comprises a digital video signal in a video conference.

13. The method of claim 8, wherein the display module comprises one selected from: a plasma display, a liquid crystal display, organic light emitting diode display, and field emissive device display.

14. The method of claim 8, wherein displaying the frame on the display module occurs less than or equal to 150 milliseconds after a remote endpoint generates the digital signal.

15. A logic stored in a non-transitory computer readable medium for reducing the latency added by a display device, the logic encoded in media and operable when executed to:
receive a digital signal having an associated frame rate at an input module, the digital signal comprising a frame including a total number of pixels;
store one or more of the pixels in a frame buffer;
determine the frame rate of the digital signal;
determine a pixel delay from the frame rate, the pixel delay including a threshold number of pixels;
determine a stored number of pixels in the frame buffer; and in response to determining the stored number of pixels is greater than or equal to the threshold number of pixels but less than the total number of pixels, instruct the frame buffer to initiate transmission of the pixels to the display module.

16. The logic of claim 15, wherein the frame buffer has stored less than one percent of the total number of pixels corresponding to the frame when the frame buffer is instructed to initiate transmission of the pixels to the display module.

17. The logic of claim 15, wherein determining the pixel delay comprises:
accessing a minimum pixel table;
comparing the frame rate to one or more industry standard frame rates stored in the minimum pixel table; and
setting the pixel delay to a delay indicated by the industry standard frame rate corresponding to the frame rate.

18. The logic of claim 15, wherein:
the input module receives the digital signal in a first format; and
the display module receives the pixels in a second format, the second format different than the first format.

19. The logic of claim 15, wherein the digital signal comprises a digital video signal in a video conference.

20. The logic of claim 15, wherein the display module comprises one selected from: a plasma display, a liquid crystal display, organic light emitting diode display, and field emissive device display.

21. The logic of claim 15, wherein displaying the frame on the display module occurs less than or equal to 150 milliseconds after a remote endpoint generates the digital signal.

22. A display device for reducing latency comprising:
means for receiving a digital signal having an associated frame rate at an input module, the digital signal comprising a frame including a total number of pixels;
means for storing one or more of the pixels in a frame buffer;
means for determining the frame rate of the digital signal;
means for determining a pixel delay from the frame rate, the pixel delay including a threshold number of pixels;
means for determining a stored number of pixels in the frame buffer; and
means for instructing the frame buffer to initiate transmission of the pixels to the display module in response to determining the stored number of pixels is greater than or equal to the threshold number of pixels but less than the total number of pixels.

23. A conference room for conducting a reduced latency communication comprising:
a user interface operable to receive a user input and to generate an instruction to initiate a communication; and
a conference coordination module operable to receive the instruction from the user interface, to initiate the communication, to receive a digital signal from the remote endpoint, and to communicate the digital signal to a display device;
wherein the display device comprises:
an input module operable to receive a digital signal having an associated frame rate, the digital signal comprising a frame including a plurality of pixels;
a frame buffer operable to store one or more of the pixels;
a display module operable to receive the pixels and to display the frame; and
a controller operable to determine the frame rate of the digital signal, to determine a pixel delay from the frame rate, to monitor the frame buffer, and, when the frame buffer contains a number of pixels greater than or equal to the pixel delay but less than all pixels corresponding to the frame, to instruct the frame buffer to initiate transmission of the pixels to the display module.

* * * * *